United States Patent
Miller et al.

(10) Patent No.: US 7,436,831 B2
(45) Date of Patent: Oct. 14, 2008

(54) WIRELESS NETWORK LOAD GENERATOR DYNAMIC MAC HARDWARE ADDRESS MANIPULATION

(75) Inventors: Douglas M. Miller, Santa Barbara, CA (US); Ken Balmy, Santa Barbara, CA (US); Jeff A Bechdol, Santa Barbara, CA (US)

(73) Assignee: IXIA, Calabasas, CA (US)

( * ) Notice: Subject to any disclaimer, the term of this patent is extended or adjusted under 35 U.S.C. 154(b) by 601 days.

(21) Appl. No.: 11/018,034

(22) Filed: Dec. 20, 2004

(65) Prior Publication Data

US 2005/0141469 A1    Jun. 30, 2005

Related U.S. Application Data

(60) Provisional application No. 60/533,287, filed on Dec. 29, 2003.

(51) Int. Cl.
*H04L 12/56* (2006.01)

(52) U.S. Cl. .................................. 370/389; 370/392

(58) Field of Classification Search ................ 370/389, 370/392, 400, 401, 419–421, 463, 471
See application file for complete search history.

(56) References Cited

U.S. PATENT DOCUMENTS

| | | | |
|---|---|---|---|
| 5,570,366 A * | 10/1996 | Baker et al. ................. 370/312 |
| 6,272,450 B1 | 8/2001 | Hill |
| 6,601,020 B1 | 7/2003 | Myers |
| 6,628,965 B1 | 9/2003 | LaRosa |
| 6,724,730 B1 | 4/2004 | Mlinarsky |
| 6,895,443 B2 * | 5/2005 | Aiken ........................ 709/245 |
| 7,075,893 B1 | 7/2006 | Mlinarsky |
| 7,099,438 B2 | 8/2006 | Rancu et al. |
| 7,180,899 B2 * | 2/2007 | De Silva et al. ........ 370/395.31 |
| 2002/0138226 A1 | 9/2002 | Doane |
| 2002/0143787 A1 | 10/2002 | Knee |
| 2003/0009544 A1 | 1/2003 | Wach |
| 2003/0018804 A1 * | 1/2003 | Laxman et al. ............. 709/236 |
| 2003/0139919 A1 | 7/2003 | Sher |
| 2003/0158917 A1 | 8/2003 | Andrew |
| 2003/0202486 A1 | 10/2003 | Anton |
| 2003/0231741 A1 | 12/2003 | Rancu et al. |
| 2003/0236089 A1 | 12/2003 | Beyme |
| 2004/0001492 A1 * | 1/2004 | Johnson ................ 370/395.32 |
| 2004/0146052 A1 | 7/2004 | Chang |
| 2005/0013255 A1 | 1/2005 | Knop |

(Continued)

OTHER PUBLICATIONS

U.S. Appl. No. 10/776,413, Mlinarsky.

*Primary Examiner*—Wing F. Chan
*Assistant Examiner*—Duc T Duong
(74) *Attorney, Agent, or Firm*—SoCal IP Law Group LLP; Steven C. Sereboff; Mark Andrew Goldstein

(57) ABSTRACT

A method and system using a single wireless network interface to selectively accept for further processing frames transmitted in a wireless data communications network is disclosed. A host system may emulate multiple, concurrently active stations in the wireless network. Each emulated station is assigned a unique address. A network Medium Access Control (MAC) hardware address of the system's wireless network interface is dynamically updated to reflect the address of one of the emulated wireless stations. The method and system allow multiple wireless stations to be emulated with a single network interface device.

14 Claims, 1 Drawing Sheet

U.S. PATENT DOCUMENTS

2005/0053008 A1    3/2005  Griesing
2005/0076145 A1*   4/2005  Ben-Zvi et al. ............. 709/245
2005/0163123 A1*   7/2005  Gangadharan ............. 370/392
2006/0229018 A1   10/2006  Mlinarsky

* cited by examiner

WIRELESS NETWORK LOAD GENERATOR DYNAMIC MAC HARDWARE ADDRESS MANIPULATION

REFERENCE TO A RELATED APPLICATION

This application is entitled to, and claims the benefit of, the 29 Dec. 2003 filing date of provisional application No. 60/533,287.

TECHNICAL FIELD OF THE INVENTION

The present invention relates generally to the field of wireless data communications and, specifically, to the emulation of multiple stations in a wireless network.

BACKGROUND OF THE INVENTION

A wireless data communications network is characterized by two or more stations which share the use of a common wireless communications medium or channel to facilitate transmission of data packets or frames between communicating peers. Since the medium is shared among all stations in the network, some means of controlling access to the medium is required to prevent two stations from simultaneously attempting to control the medium. Wireless communication is further complicated by the lack of a tangible physical medium making the connection between stations.

Communications must adhere to the protocols prescribed by the specifications applicable to the particular type of wireless communications network at hand. Such wireless standards specify a general format for data packets or frames transmitted on the network, as well as a protocol to be followed by communicating peers and other stations sharing the network medium.

The frame format typically includes some MAC (medium access control) addressing mechanism to distinguish the frame intended to be received by a particular station on the network (i.e., the wireless station assigned that MAC address), in which case the other stations on the network may ignore the frame. To mitigate the vagaries of frame transmission in a wireless network, the receiving station is typically required to provide positive acknowledgement that it has successfully received the frame. The acknowledgement also informs other stations that the use of the medium for the current frame is now complete and that the medium is now available for other use.

In some applications it is desirable to operate several stations within a single device. An illustrative example is a device which mimics the operation of a number of wireless stations for test purposes. A device of this character is disclosed in application Ser. No. 10/424,161 filed 25 Apr. 2003. That application is, in its entirety, incorporated herein by reference.

In applications as described in the preceding paragraph, the device or system emulates multiple wireless stations, each with its distinct and unique MAC address. The wireless stations so emulated appear from the network standpoint to be distinct nodes on the network, these nodes being concurrently active in accordance with protocol requirements.

A fundamental problem to be solved in such a system is how to share the system's single wireless interface and MAC hardware among the several emulated stations and to do so in a way that satisfies the requirements of a particular wireless communication protocol; specifically, to generate proper acknowledgement for received frames and to receive acknowledgement for transmitted frames. When exchanging frames on the wireless network, the receiver must send an acknowledgement to the sender. If the sender does not receive the acknowledgment, it will attempt to resend the frame up to some maximum number of retries. Other stations on the wireless network may not use the communication medium until the acknowledgement is sent, up to a period of some maximum duration.

All stations are required to refrain from initiating a new frame exchange on the medium for the duration of the current frame exchange. The acknowledgement/retry logic is typically implemented in the interface hardware to avoid the slower response time and additional processor overhead of a software implementation. This unfortunately prevents the system software from being able to initiate an acknowledgement in a timely manner, leading to multiple resends and timeouts. There is accordingly an existing and continuing need in a system as described above for a mechanism that will allow the wireless stations emulated by the system to so share the wireless communication network and the wireless data communication medium that delays in acknowledgement of transmitted and received messages which would otherwise tie up communications in the wireless data communications network can be avoided.

SUMMARY OF THE INVENTION

Methods and systems for achieving this objective have now been invented and are disclosed herein. Broadly stated, the present invention relates to a technique for dynamically altering the MAC address of a wireless network interface as necessary to support the concurrent emulation of multiple virtual wireless stations. The virtual stations so emulated comprise a population of wireless network stations, which may be the source and/or destination for network traffic and are operated within and under the control of a wireless network load generator device. This goal is achieved uniquely, inexpensively and without any need for time-consuming development of specialty hardware via control software manipulation of a commercially available wireless network interface hardware implementation.

The wireless network interface hardware is aware of its MAC address and acknowledges frames transmitted from other stations to the station with that MAC address. This same protocol is used when transmitting frames; the interface must be aware of the address of the emulated station on whose behalf it is sending the frame so that the interface can properly receive the acknowledgement and thus prevent the frame from being unnecessarily resent.

In particular, the wireless network interface is set into a "promiscuous" mode in which it passively receives and may inspect all frames transmitted on the medium, whether or not they are addressed to the station in which the interface is installed. By placing the interface in the promiscuous mode, the system can be made aware of frames addressed to a virtual station being emulated by the host system and so change the address in the interface hardware (if necessary) that it can acknowledge the frame. The remote station sending the frame is expected to retry the transmission in the event that receipt of the frame is not initially acknowledged. If the hardware MAC address matches the receiver address in the incoming frame at the time it is received, no hardware address change is necessary. It is assumed in this case that the acknowledgement was properly sent, and the system may proceed with normal receive processing.

Broadcast frames, as defined by the pertinent communications protocol specification, are accepted in all cases. Multicast frames are similarly accepted, subject to validation of the multicast group according to the protocol specified for the wireless communications medium at hand, which is outside the scope of the present invention.

In addition, when preparing a frame for transmission on the wireless medium, the MAC address in the hardware is set to the address of the sending virtual station, which is contained in the frame header section. This is done on a frame-by-frame basis and allows the interface hardware to accept the acknowledgement for the frame. To accomplish this, a first-in, first-out (FIFO) queue of transmit frame descriptors is maintained in the control software. Frame descriptors are placed in this queue as frames are transmitted by the virtual stations emulated in the system.

This software transmit queue is held in isolation from the transmit queue expected by the interface hardware; the actual queue used by the hardware is limited to a maximum depth of one descriptor.

Upon successful transmission of one frame, the next transmit frame descriptor is removed from the software queue, the hardware is reprogrammed with the address of the emulated station sending the frame, and the descriptor is replaced into the hardware queue.

There is an inherent conflict over use of the hardware (specifically, control of the hardware MAC address) between the receive process and the transmit process. Precedence is given to the transmit process; the receive process must defer and cannot change the hardware MAC address for its current frame if a transmission is currently in process. This reduces internal queuing requirements imposed by frames awaiting transmission within the system and takes advantage of the self-healing nature afforded by the retry mechanism for frames transmitted to an emulated station from a remote peer station.

By manipulating the address of the physical interface as disclosed above, the wireless protocol is satisfied with respect to frame acknowledgements; and the host system is able to emulate several virtual stations, each concurrently active and contending for use of the wireless medium in accordance with protocol.

DETAILED DESCRIPTION OF THE INVENTION

Figure 1:
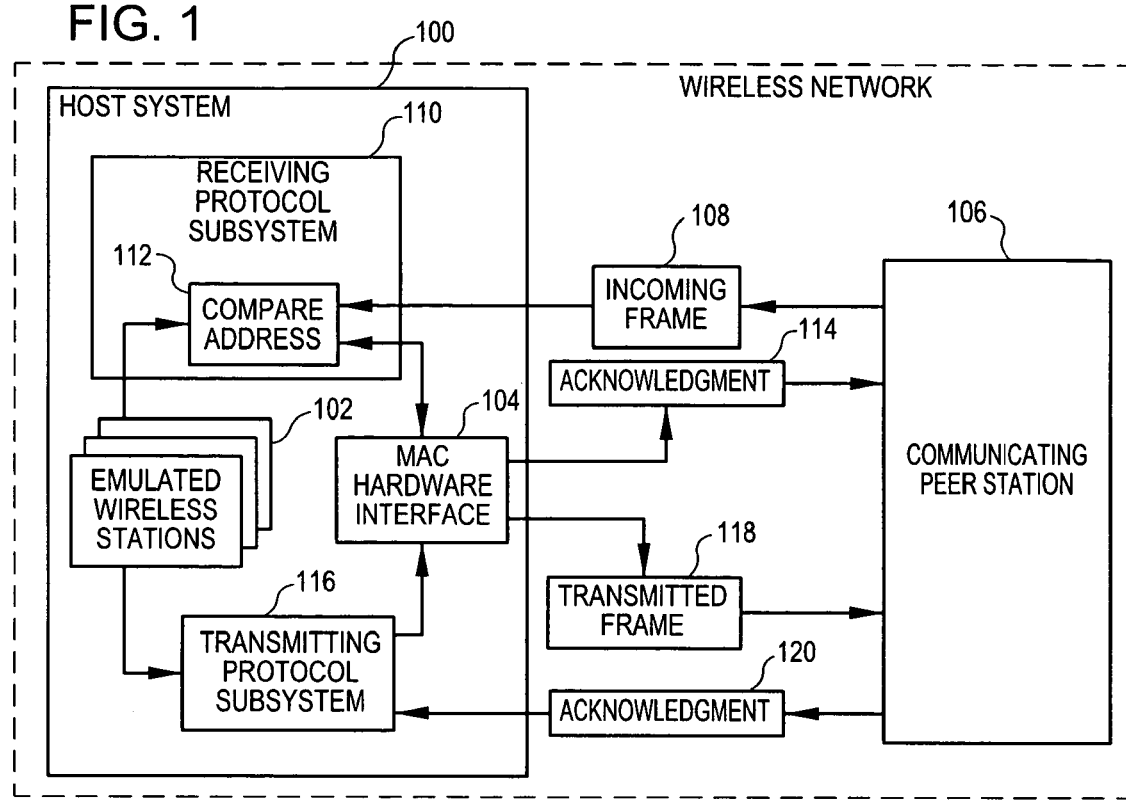
FIG. 1 is a block diagram depicting relevant components of a wireless network load generator system which emulates several virtual stations on the wireless network. The host system boundary as drawn does not encompass all subsystems and components of the system; only those relevant to the present invention are shown. This figure shows the interaction of system components with respect to inbound and outbound frame transmissions on the wireless network.

Referring first to FIG. 1, a host system 100 emulates the operation of multiple virtual wireless stations 102, which all access the wireless network via a single MAC hardware interface 104. This interface is a subsystem of host system 100. MAC hardware interface 104 is set in a "promiscuous" mode in which it can passively accept all frames received on the wireless network, whether or not they are addressed to an emulated virtual station 102.

When a remote (communicating) peer station 106 wishes to send data to one of the emulated virtual stations 102, it places the data in a packet or frame and transmits the frame via the wireless communication medium. The incoming frame 108 is received at the interface 104, where the receiving protocol subsystem 110 examines the receiver address indicated in the frame. If an address comparison subsystem 112 indicates that the receiver address is equal to the current MAC hardware interface 104 address, an acknowledgement 114 is immediately generated by the interface hardware; and the frame is passed through normal system receive processing.

If the receiver address in the incoming frame 108 does not match the current MAC hardware interface 104 address, the receiver address is compared against the MAC addresses of all emulated virtual stations 102. If the receiver address does not match any of the emulated stations 102, the frame is discarded (broadcast and multicast frames are not subject to address matching and are accepted as indicated above). If there is an address match with an emulated virtual station 102, the MAC hardware interface 104 address is reprogrammed by the receiving protocol subsystem 110 with that station address.

Before this can be done, a check must be made to ensure the host system 100 is not currently attempting to transmit a frame. If the system is in the process of transmitting a frame, the current receiver address is discarded; and the frame is not processed further by the system at this time. Acknowledgment is attempted again as required when the originating peer station 106 retries its transmission of the frame.

If the above check indicates that the host system 100 is not in the process of transmitting a frame, the MAC hardware interface 104 is reprogrammed by receiving protocol substation 110 with the receiver address. The originating peer station 106 then retries its transmission of the frame, at which time the address comparison operation in subsystem 112 and subsequent processing are repeated as described above.

When an emulated virtual station 102 has data to transmit to a communicating peer station 106, emulated virtual station 102 prepares a frame containing the data and passes it to transmitting protocol subsystem 116. The transmitting protocol subsystem 116 queues the frame for transmission as further illustrated in FIG. 2 and described in more detail below.

When the frame is ready for transmission, the transmitting protocol subsystem 116 obtains from the frame header the MAC address of the emulated virtual station 102 sending the frame. Transmitting protocol subsystem 116 programs this address into the MAC hardware interface 104, which transmits the outgoing frame 118 via the wireless medium. The peer station 106 to which the frame is addressed responds with acknowledgement 120, indicating that the peer station has successfully received the frame, signaling completion of the transmission. If the acknowledgement 120 is not received in a timely fashion, the transmitting protocol subsystem 116 retries the transmission, up to some maximum number of retries.

Figure 2:
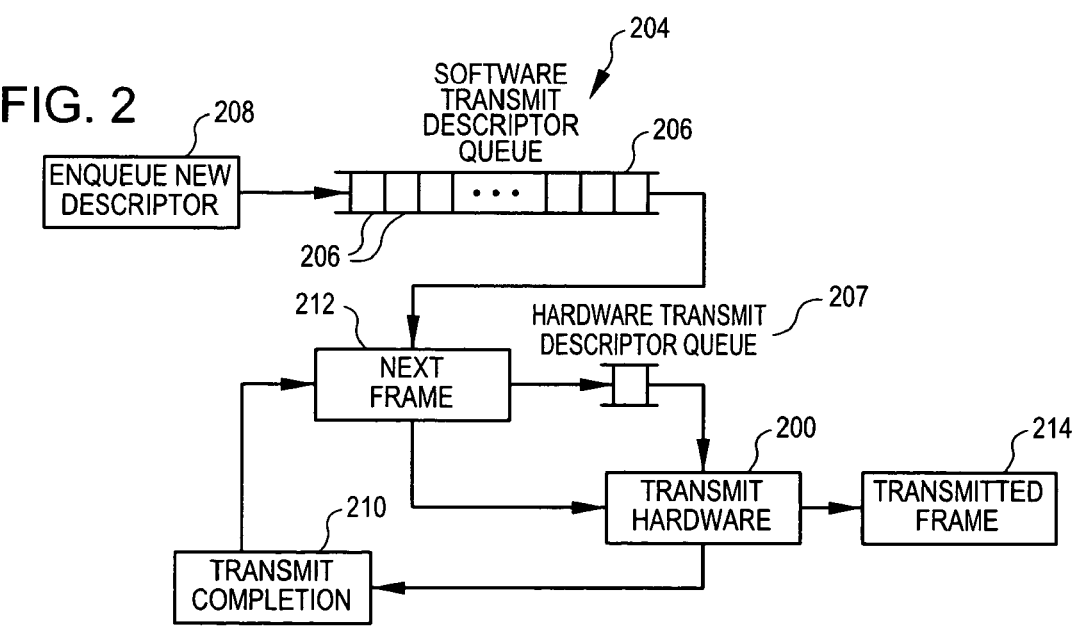
FIG. 2 is a block diagram which illustrates control of the two transmit queues, one maintained solely in software and one implemented in hardware and controlled by the software for use by the wireless network interface hardware. The queue contents comprise a linked list of descriptors, which are data structures used for manipulation of receive and transmit frames throughout the receive and transmit processes, respectively.

FIG. 2 illustrates, in more detail, queuing mechanism used in the course of frame transmission. In general, the wireless network interface transmit hardware 200 accesses a hardware queue 207 of transmit frame descriptors by direct memory access (DMA). A transmit frame descriptor is a data structure associated with each individual transmit frame. The transmit frame descriptor is accessible by both the transmitting protocol subsystem 116 and the transmit hardware 200. It contains control information by which the transmitting protocol subsystem 116 communicates specific handling instructions for each transmit frame to the transmit hardware 200 and by which the transmit hardware 200 communicates status information for the transmit frame back to the transmitting protocol subsystem 116.

As frames are readied for transmission, their descriptors are enqueued in a first-in, first-out (FIFO) fashion, the transmit hardware is informed by the transmitting protocol subsystem 116 of the location in system memory where the queue is located, and the hardware transmit process is started. The software program which controls the operation of the host system 100 inserts frame descriptors in the queue; and the interface hardware processes descriptors, starting with the oldest descriptor in the queue. The transmit hardware 200 transmits the frame associated with a given descriptor and then retrieves and processes the next descriptor in the queue, continuing this process until the end of the queue is reached.

In this new and novel system as currently implemented, two transmit queues are maintained: software transmit descriptor queue 204 and a hardware transmit descriptor queue 207. The hardware transmit descriptor queue 207 is limited to a maximum depth of one descriptor, so that the transmit hardware 200 will not transmit more than one frame in succession without intervention by the control software.

When a new frame is to be transmitted, its descriptor 206 is enqueued (reference character 208) along with the descriptors 206 of any other frames currently awaiting transmission. If the software queue 204 is not empty or there is a transmission currently in progress, the new descriptor 206 is inserted at the end of the software queue 204. The software queue 204 cannot contain frames awaiting transmission unless there is a transmission currently in progress. When the transmit hardware 200 signals the completion 210 of a frame transmission, the control software causes the following to be accomplished:

The current transmit frame descriptor (i.e., the descriptor for that frame just transmitted) is removed from the hardware transmit queue 204, leaving that queue empty.

The next descriptor 206, if any, is removed (reference character 212) from the software transmit queue 204 and placed in the hardware transmit queue 207.

The MAC address in the wireless network interface hardware 200 is set to the address of the emulated virtual station 102 sending the frame.

The interface hardware 200 is notified of the new contents of the hardware transmit queue 207, and its transmit process is restarted.

The interface hardware 200 accesses the frame in the hardware queue 207 via a DMA transfer.

The transmit hardware 200 transmits the frame via the wireless medium as indicated by reference character 214.

If, at the time a new frame is to be enqueued (reference character 208), the software transmit queue 204 is empty and there is no current transmission in progress, this indicates that there are no other frames awaiting transmission. In this case the transmit frame descriptor 206 bypasses the software queue 204 and proceeds directly to transmit processing by the transmit hardware 200 as described above. The indication of transmission for this frame is also identified by reference character 214.

What is claimed is:

1. A method comprising:
    placing a wireless network interface in a promiscuous mode;
    receiving via the wireless network interface all frames transmitted on a wireless communication medium;
    dynamically reprogramming a MAC address of the wireless network interface as indicated by a current incoming frame;
    preparing a virtual station transmit frame for wireless transmission including setting the MAC address of the network interface to the address of a sending virtual station based on a receiver address contained in each current incoming frame on a frame-by-frame basis so that the network interface can send an acknowledgement of receipt for the current incoming frame.

2. The method of claim 1 wherein the dynamically reprogramming further comprises:
    comparing a receiver address in the current incoming frame with a plurality of MAC addresses of a plurality of emulated stations;
    discarding the current incoming frame if the receiver address does not match any of the plurality of MAC address of the plurality of emulated stations based on the comparing;
    reprogramming the network interface MAC address to be the address of the receiver address of the current incoming frame if the receiver address matches one of the MAC address of one of the emulated stations based on the comparing; and
    acknowledging receipt of the current incoming frame if the receiver address matches one of the MAC address of one of the emulated stations.

3. The method of claim 1 further comprising:
    not performing the dynamically reprogramming if the receiver address of the current incoming frame matches the network interface MAC address.

4. The method of claim 3 further comprising:
    keeping the MAC address of the network interface from being changed while the transmission of a frame is in progress.

5. The method of claim 4 further comprising:
    discarding incoming frames received while an outgoing frame is being transmitted.

6. The method of claim 1 further comprising:
    maintaining a first-in, first-out (FIFO) queue of transmit frame descriptors;
    receiving frame descriptors of frames to be transmitted on a network;
    placing the frame descriptors in the FIFO queue as frames are provided to the network interface by the virtual stations;
    removing the frame descriptor of a current transmit frame from the FIFO queue when the current transmit frame is successfully transmitted;
    reprogramming the MAC address of the network interface with the address of the virtual station of the next transmit frame associated with the frame descriptor in the FIFO queue; and
    placing the frame descriptor of the next transmit frame in a hardware transmit queue.

7. The method of claim 6 wherein the hardware transmit queue has a maximum depth of one descriptor.

8. The method of claim 7 further comprising:
    removing upon completion of transmission the current transmit frame descriptor from the hardware transmit queue, leaving the hardware transmit queue empty;
    placing a next frame descriptor from the FIFO queue in the hardware transmit queue so that the next frame descriptor becomes the current transmit frame descriptor;
    removing the next frame descriptor from the FIFO queue;

setting the MAC address of the wireless network interface to the address of the current transmit frame descriptor in the hardware transmit queue;

notifying the network interface of the new contents of the hardware transmit queue;

restarting a transmit protocol of the network interface;

accessing data associated with the current transmit frame descriptor in the hardware transmit queue; and transmitting the current transmit via the wireless network interface onto the wireless medium.

9. The method of claim 8 wherein the accessing is achieved via a DMA transfer.

10. The method of claim 6 further comprising:

bypassing the software queue if the software queue is empty when a transmit frame is to be enqueued and no other transmission is currently in progress such that the transmit frame is directly processed for transmittal.

11. The method of claim 6 wherein the transmit frame descriptors contain control information for enabling a transmitting protocol system to communicate specific frame handling instructions to frame transmitting hardware, wherein the frame handling instructions enable the frame transmitting hardware to communicate the status of the frame to the transmitting protocol system.

12. The method of claim 1 wherein the network interface is a hardware device or a hardware system.

13. A system to emulate a plurality of virtual stations comprising:

a MAC hardware network interface a receiving protocol subsystem to receive a plurality of frames from a wireless communications medium as received frames via the MAC hardware network interface;

generate via the MAC hardware network interface an acknowledgment of a current received frame if a receiver address of the current received frame matches a current address of the MAC hardware network interface;

discard the current received frame if the receiver address of the current received frame does not match any of a plurality of addresses of the virtual stations;

reprogram the MAC hardware network interface if the receiver address of the current received frame matches one of the plurality of addresses of the virtual stations and the MAC hardware interface is not currently transmitting;

a transmitting protocol subsystem to obtain from a transmit queue a current transmit frame;

map a MAC address of the current transmit frame to the MAC hardware network interface;

transmit onto the wireless communications medium the current transmit frame via the MAC hardware network interface.

14. A system comprising:

a plurality of virtual stations, each having an emulated address;

a MAC hardware network interface set in a promiscuous mode to accept all frames received on a wireless network;

a receiving protocol subsystem coupled with the MAC hardware network interface, the receiving protocol subsystem to receive frames from the MAC hardware network interface;

determine whether a receiver address contained in a current received frame matches a current address of the MAC hardware network interface;

with those received frames with receiver addresses which match the current MAC hardware interface address, generate an acknowledgement of the receipt of each matching frame;

compare the receiver address of a received frame which does not match the current address of the MAC hardware network interface with the plurality of emulated addresses;

discard those received frames having receiver addresses that do not match any of the plurality of emulated addresses; and reprogram the MAC hardware network interface with the receiver address of the received frame if the receiver address matches one of the plurality of emulated addresses.

* * * * *